United States Patent
Altamirano et al.

(10) Patent No.: US 9,875,459 B2
(45) Date of Patent: Jan. 23, 2018

(54) WELLSITE EQUIPMENT TRACKING SYSTEMS AND METHODS

(71) Applicant: SCHLUMBERGER TECHNOLOGY CORPORATION, Sugar Land, TX (US)

(72) Inventors: Arturo E. Altamirano, Stafford, TX (US); Graham LeBlanc, Richmond, TX (US); Ilmo Jung, Houston, TX (US); Mark Maher Hakim Ayyad, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/949,152

(22) Filed: Nov. 23, 2015

(65) Prior Publication Data
US 2017/0147963 A1    May 25, 2017

(51) Int. Cl.
*G06Q 30/00* (2012.01)
*G06Q 10/08* (2012.01)
*E21B 41/00* (2006.01)
*G06K 7/10* (2006.01)
*G06K 19/077* (2006.01)

(52) U.S. Cl.
CPC ....... *G06Q 10/087* (2013.01); *E21B 41/0092* (2013.01); *G06K 7/10009* (2013.01); *G06K 19/07758* (2013.01)

(58) Field of Classification Search
CPC .. G06Q 10/08; G06Q 10/0833; G06Q 10/087; G06Q 10/06; G06Q 50/22; G06Q 50/28; G06Q 20/3278; G06K 2017/0045; G06K 17/0029; G06K 19/0723;
(Continued)

(56) References Cited

U.S. PATENT DOCUMENTS 5,565,858 A * 10/1996 Guthrie ................ G01S 19/09
235/385
6,985,750 B1    1/2006 Vicknair et al.
(Continued)

FOREIGN PATENT DOCUMENTS

WO    2009077718 A2    6/2009

OTHER PUBLICATIONS

International Search Report and Written Opinion issued in International Patent Appl. No. PCT/US2016/063436 dated Mar. 9, 2017; 21 pages.

*Primary Examiner* — Thien M Le
(74) *Attorney, Agent, or Firm* — Michael L. Flynn; Rachel E. Greene; Robin Nava

(57) ABSTRACT

The present disclosure introduces methods and systems for tracking pieces of wellsite equipment. Such tracking includes receiving first identification information and first location information for a first module associated with a first piece of wellsite equipment at a first location, receiving second identification information for a second module associated with a second piece of wellsite equipment at the first location, and determining a tracking event associated with the second piece of wellsite equipment based on the first identification information, the first location information, and the second identification information. A utilization state associated with the second piece of wellsite equipment is then determined based on at least the tracking event.

16 Claims, 9 Drawing Sheets

(58) Field of Classification Search
CPC ... G06K 7/0008; G06K 17/0022; H04W 4/02; G06F 3/1446
USPC .......... 235/385, 380, 382, 375, 492
See application file for complete search history.

(56) References Cited

U.S. PATENT DOCUMENTS

| | | | | |
|---|---|---|---|---|
| 8,280,345 | B2* | 10/2012 | Twitchell, Jr. | G06Q 10/08 340/5.7 |
| 2005/0131729 | A1 | 6/2005 | Melby et al. | |
| 2006/0190647 | A1* | 8/2006 | Asano | G06F 13/4221 710/110 |
| 2006/0236008 | A1* | 10/2006 | Asano | G06F 13/42 710/110 |
| 2008/0106409 | A1* | 5/2008 | Schmidt | A44B 15/005 340/568.1 |
| 2008/0231466 | A1 | 9/2008 | Mazrooee et al. | |
| 2008/0297312 | A1* | 12/2008 | Moshfeghi | H04L 47/10 340/10.1 |
| 2010/0265061 | A1* | 10/2010 | Harmon | G08B 21/24 340/539.13 |
| 2012/0203507 | A1 | 8/2012 | Thomeer et al. | |
| 2015/0097674 | A1* | 4/2015 | Mondal | H04W 4/02 340/572.1 |

* cited by examiner

WELLSITE EQUIPMENT TRACKING SYSTEMS AND METHODS

BACKGROUND OF THE DISCLOSURE

In oilfield operations, including drilling, cementing, acidizing, water jet cutting, and hydraulic fracturing of subterranean formations, various oilfield or wellsite assets or equipment are utilized. The success of such oilfield operations may be related to many factors, including effective utilization of the wellsite equipment, as job interruptions or operational inefficiencies caused by poor logistics or equipment allocation may reduce the efficiency of the oilfield operations.

Utilization of the wellsite equipment may be optimized, in part, by accurately tracking the amount of time that wellsite equipment components spend at different locations, such as by tracking daily use. However, as wellbores are drilled deeper and become more complex, the amount and complexity of wellsite equipment continues to increase, thus complicating equipment tracking and optimization.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes receiving first identification information and first location information for a first module. The first module is associated with a first piece of wellsite equipment, and the first piece of wellsite equipment is at a location. The method also includes receiving second identification information for a second module. The second module is associated with a second piece of wellsite equipment, and the second piece of wellsite equipment is at the location. The method also includes determining a tracking event associated with the second piece of wellsite equipment. The tracking event is based on the first identification information, the first location information, and the second identification information. The method may also include determining a utilization state associated with the second piece of wellsite equipment. Determining the utilization state may be based on the tracking event.

The present disclosure also introduces a system for tracking a plurality of components associated with a wellsite. The system includes a child module associated with a first component and including a child module controller operable to control the child module to transmit identification information of the first component via a wireless local network (WLN) transceiver or a radio frequency identification (RFID) tag. The system also includes a master module associated with a second component separated from the first component. The master module includes a master module controller operable to control the master module to receive the identification information via a master WLN interface or a master RFID reader, acquire location information for the master module via a global positioning system (GPS), and transmit the identification information and the location information to a server remote from the wellsite via a wireless wide area network (WWAN) transceiver.

The present disclosure also introduces an apparatus that includes an apparatus controller operable to control the apparatus to receive a tracking event associated with a first piece of wellsite equipment at a location. The tracking event is based on first identification information for a first module associated with the first piece of wellsite equipment, but not location information for the first module. The tracking event is also based on second identification information for a second module, and location information for the second module. The second module is associated with a second piece of wellsite equipment at the location. The apparatus controller is also operable to control the apparatus to determine a utilization state associated with the first piece of wellsite equipment. Determining the utilization state is based on the tracking event.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
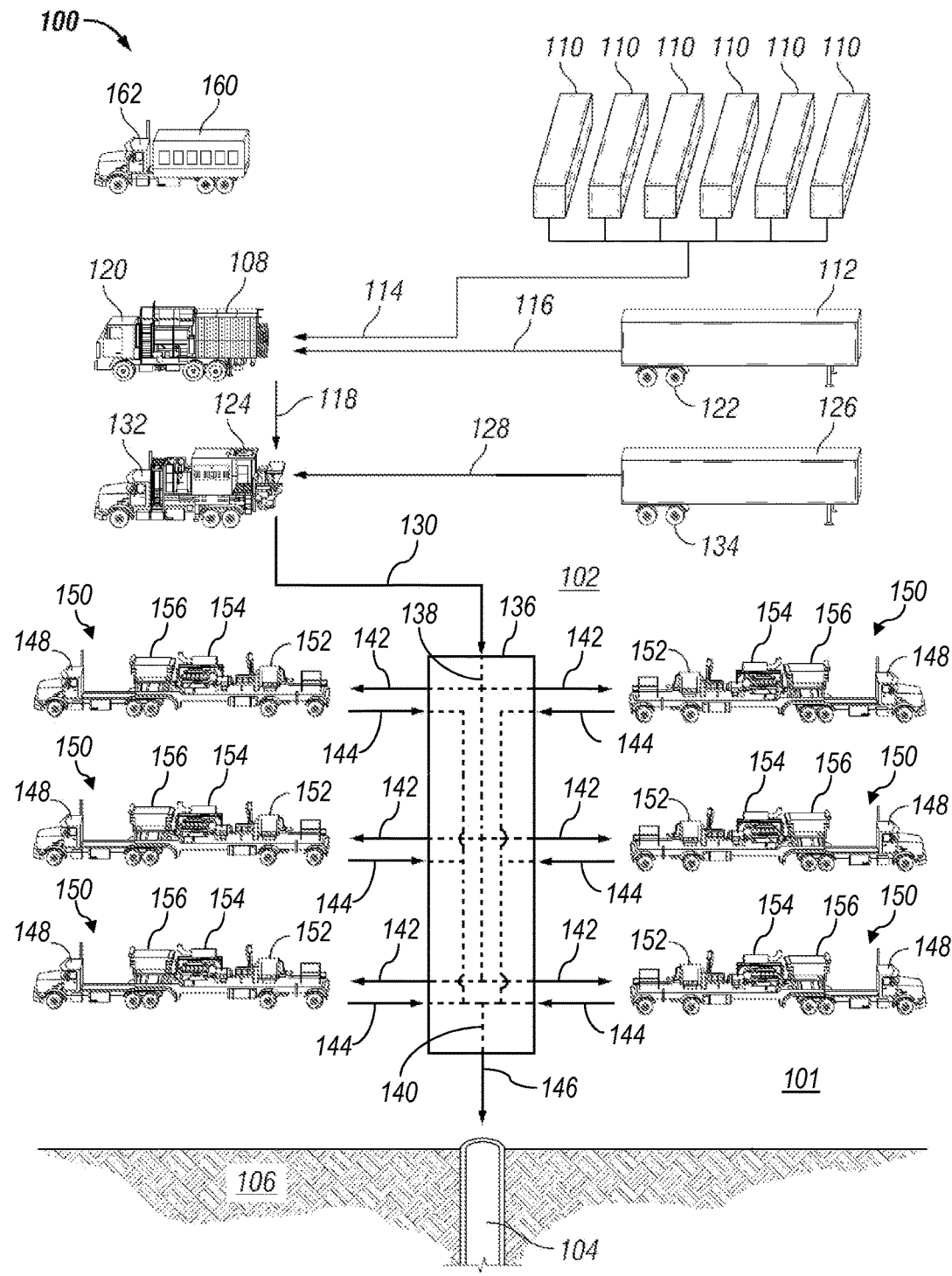
FIG. 1 is a schematic view of at least a portion of an example implementation of apparatus related to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure describes a tracking system operable for tracking the location of oilfield or wellsite equipment, components, or assets (hereinafter referred to collectively as "wellsite equipment") and comprising a plurality of tracking devices (hereinafter referred to as "modules") comprising different communication, interface, processing, and other features. Different types of modules may be mounted in association with different types of wellsite equipment, permitting the tracking system to determine the location of each piece of wellsite equipment and to collect additional data associated with each piece of wellsite equipment. The information generated or collected by the plurality of modules over a period of time may be transmitted in a single message or communication by a selected module to a location remote from the wellsite for processing. The tracking system may be utilized with various types of wellsite equipment while the wellsite equipment is operated at a wellsite, stationed at a base facility, repaired at a maintenance shop, and/or transported between the wellsite and the base facility.

FIG. 1 is a schematic view of at least a portion of an example environment in which a tracking system according to one or more aspects of the present disclosure may be utilized. The figure shows a wellsite system 100 at a wellsite 101 adjacent to a wellbore 104, a partial sectional view of the subterranean formation 106 penetrated by the wellbore 104 below the wellsite 102, and various pieces of wellsite equipment or components that may be tracked utilizing the tracking system.

The wellsite system 100 may comprise a first mixer 108 fluidly connected with one or more tanks 110 and a first container 112. The first container 112 may contain a first material and the tanks 110 may contain a liquid. The first material may be or comprise a hydratable material or gelling agent, such as guar, polymers, synthetic polymers, galactomannan, polysaccharides, cellulose, and/or clay, among other examples. The liquid may be or comprise an aqueous fluid, which may comprise water or an aqueous solution comprising water, among other examples. The first mixer 108 may be operable to receive the first material and the liquid, via two or more fluid conduits 114, 116, and mix or otherwise combine the first material and the liquid to form a base fluid. The base fluid may be or comprise that which is known in the art as a gel. The first mixer 108 may then discharge the base fluid via one or more fluid conduits 118.

The first mixer 108 and the first container 112 may each be disposed on corresponding trucks, trailers, and/or other mobile carriers 120, 122, respectively, such as may permit their transportation to the wellsite 101. However, the first mixer 108 and/or first container 112 may be skidded or otherwise stationary, and/or may be temporarily or permanently installed at the wellsite 101.

The wellsite system 100 may further comprise a second mixer 124 fluidly connected with the first mixer 108 and a second container 126. The second container 126 may contain a second material that may be substantially different than the first material. For example, the second material may be or comprise a proppant material, such as sand, sand-like particles, silica, quartz, and/or propping agents, among other examples. The second mixer 124 may be operable to receive the base fluid from the first mixer 108 via one or more fluid conduits 118, and the second material from the second container 126 via one or more fluid conduits 128, and mix or otherwise combine the base fluid and the second material to form a mixture. The mixture may be or comprise that which is known in the art as a fracturing fluid. The second mixer 124 may then discharge the mixture via one or more fluid conduits 130.

The second mixer 124 and the second container 126 may each be disposed on corresponding trucks, trailers, and/or other mobile carriers 132, 134, respectively, such as may permit their transportation to the wellsite 101. However, the second mixer 124 and/or second container 126 may be skidded or otherwise stationary, and/or may be temporarily or permanently installed at the wellsite 101.

The mixture may be communicated from the second mixer 124 to a common manifold 136 via the one or more fluid conduits 130. The common manifold 136 may comprise a plurality of valves and diverters, as well as a suction line 138 and a discharge line 140, such as may be collectively operable to direct the flow of the mixture in a selected or predetermined manner. The common manifold 136, which may be known in the art as a missile or a missile trailer, may distribute the mixture to a pump fleet. The pump fleet may comprise a plurality of pump assemblies 150 each comprising a pump 152, a prime mover 154, and perhaps a heat exchanger 156. Each pump assembly 150 may receive the mixture from the suction line 138 of the common manifold 136, via one or more fluid conduits 142, and discharge the mixture under pressure to the discharge line 140 of the common manifold 136, via one or more fluid conduits 144. The mixture may then be discharged from the common manifold 136 into the wellbore 104 via one or more fluid conduits 146, perhaps including various valves, conduits, and/or other hydraulic circuitry fluidly connected between the common manifold 136 and the wellbore 104.

The pump assemblies 150 may each be mounted on corresponding trucks, trailers, and/or other mobile carriers 148, such as may permit their transportation to the wellsite 101. However, the pump assemblies 150 may be skidded or otherwise stationary, and/or may be temporarily or permanently installed at the wellsite 101. Although the pump fleet of the wellsite system 100 is shown comprising six pump assemblies 150, the pump fleet may comprise other quantities of pump assemblies 150 within the scope of the present disclosure.

The wellsite system 100 may also comprise a control center 160, which may be operable to provide control to one or more portions of the wellsite system 100. The control center 160 may be further operable to monitor health and functionality of one or more portions of the wellsite system 100. Control signals may be communicated between the control center 160 and other wellsite equipment via electrical cables (not shown). However, other means of signal communication, such as wireless communication, are also within the scope of the present disclosure.

The control center 160 may be disposed on a corresponding truck, trailer, and/or other mobile carrier 162, such as may permit its transportation to the wellsite 101. However, the control center 160 may be skidded or otherwise stationary, and/or may be temporarily or permanently installed at the wellsite 101.

FIG. 1 shows the wellsite system 100 comprising the first mixer 108, the second mixer 124, the tanks 110, the first container 112, the second container 126, the common manifold 136, the pump assemblies 150, and the control center 160 (hereinafter collectively referred to as "wellsite equipment") collectively operable to produce and/or mix fluids that may be pressurized and injected into the wellbore 104 during hydraulic fracturing of the subterranean formation 106. However, it is to be understood that the tracking system within the scope of present disclosure may be utilized with and operable for tracking wellsite equipment utilized during other oilfield operations, such as drilling, cementing, acidizing, chemical injecting, and/or water jet cutting operations, among other examples.

Figure 2:
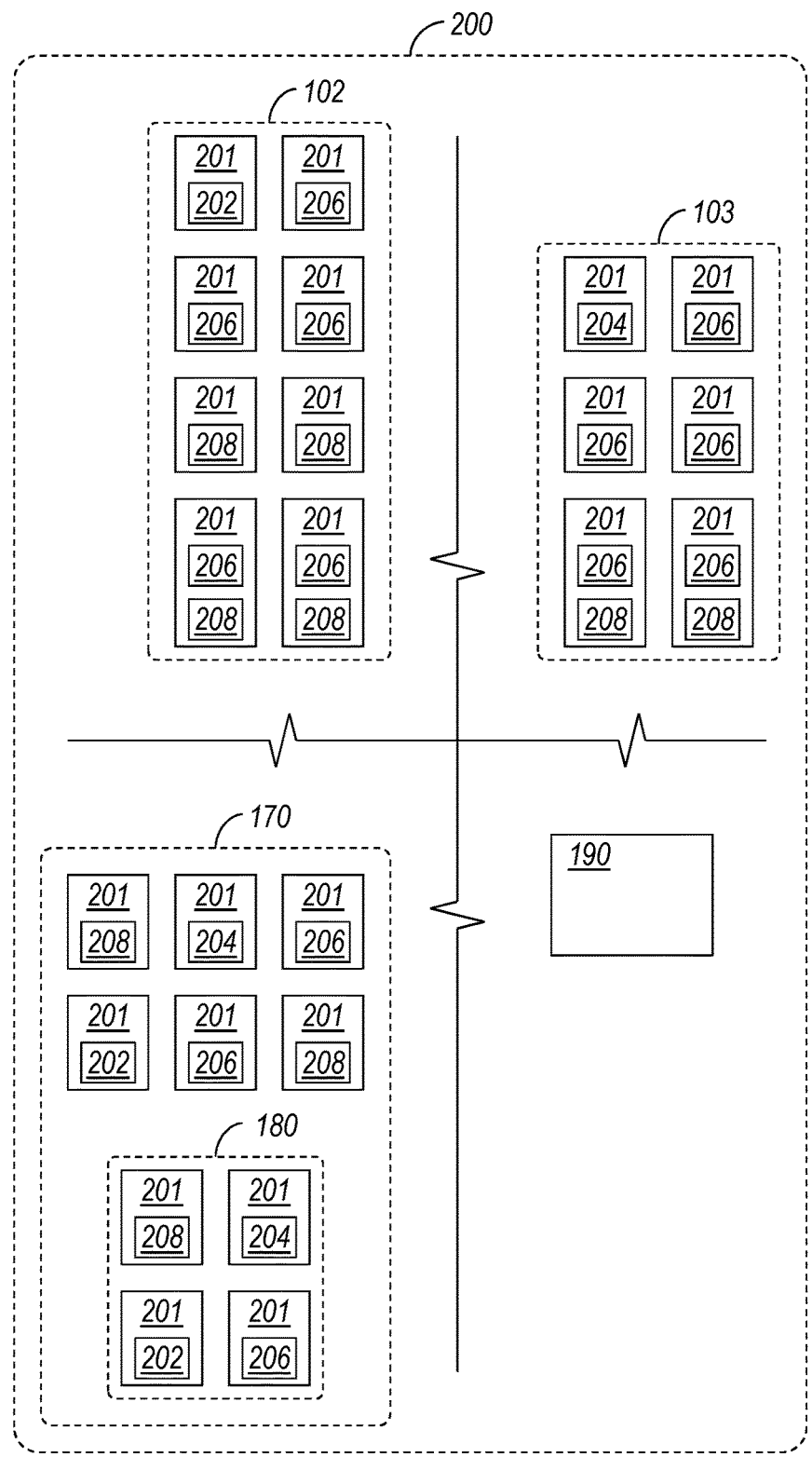
FIG. 2 is a schematic view of at least a portion of an example implementation of apparatus according to one or more aspects of the present disclosure.

FIG. 2 is a schematic view of at least a portion of an example implementation of a tracking system 200 according to one or more aspects of the present disclosure. The tracking system 200 is operable for tracking multiple wellsite equipment pieces 201 at wellsite 102 and 103 (each of which may share one or more aspects with the wellsite 101 shown in FIG. 1), a base facility 170, and/or a maintenance facility or shop 180 (such as may be located within the base facility 170), among other example locations. The tracking system 200 may be operable for such tracking while the wellsite equipment pieces 201 are being transported between such locations. The tracking system 200 also comprises or is otherwise operable in conjunction with a communication center 190. The wellsites 102, 103, the base facility 170, the maintenance shop 180, and the communication center 190 may be located at substantial distances from each other.

Implementations of the tracking system 200 within the scope of the present disclosure comprise one or more instances of one or more of a master module 202, a monitor module 204, a mesh module 206, and a radio-frequency identification (RFID) module 208. Instances of the mesh module 206, and the RFID module 208 are also referred to herein as child modules. Each module 202, 204, 206, 208 is associated with a different piece 201 of wellsite equipment, such as the various pieces of wellsite equipment shown in FIG. 1. That is, each module 202, 204, 206, 208 is mounted on, housed in, coupled to, and/or otherwise carried with that piece 201 of wellsite equipment. In this context, the piece of wellsite equipment with which a module 202, 204, 206, 208 is associated may be referred to hereinafter as the associated piece of wellsite equipment, and the module 202, 204, 206, 208 associated with that piece of wellsite equipment may be referred to hereinafter as the associated module 202, 204, 206, 208.

Each type (i.e., master, monitor, mesh, and RFID) of the modules 202, 204, 206, 208 may also correspond with certain types of wellsite equipment, as described below. Each module 202, 204, 206, 208 has a different combination of communication features and, thus, different combinations of means for communicating with other modules 202, 204, 206, 208 and/or other communication devices.

Figure 3:
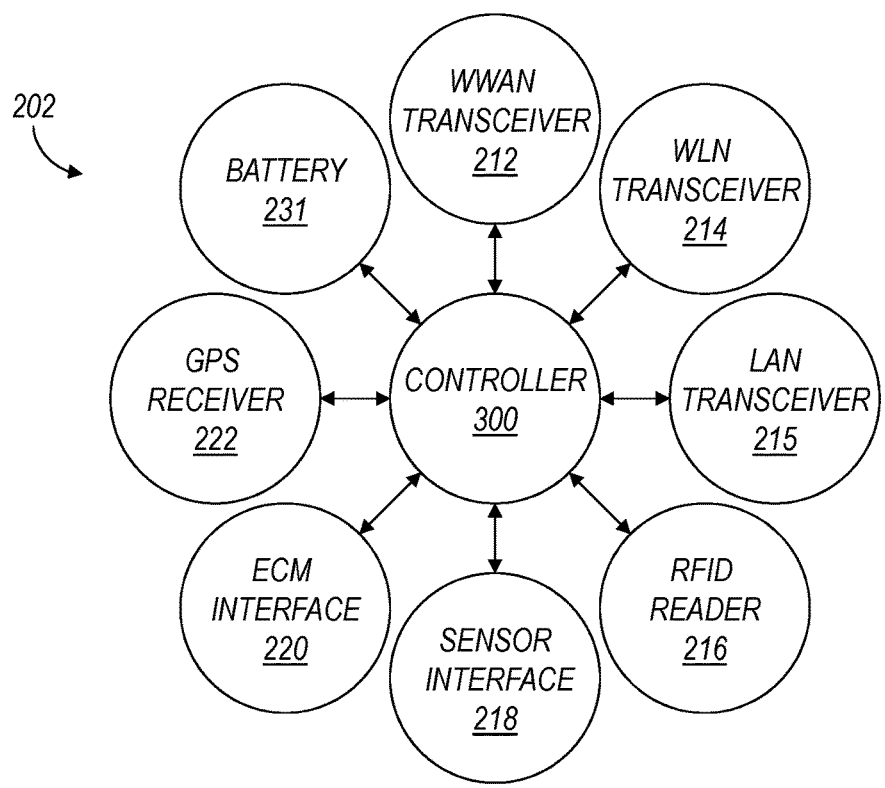
FIG. 3 is a schematic view of at least a portion of an example implementation of apparatus according to one or more aspects of the present disclosure.

FIG. 3 is a schematic view of at least a portion of an example implementation of an instance of the master module 202. An instance of the master module 202 may be associated with a piece of wellsite equipment located at each geographical location within the tracking system 200, such as the wellsites 102, 103, the base facility 170, and/or the maintenance shop 180 shown in FIG. 2. The master module 202 comprises an assortment of communication devices, each having different means of communication.

For example, the master module 202 comprises a wireless wide area network (WWAN) transceiver 212 operable to transmit and/or receive information via a WWAN, such as a mobile telecommunication cellular network or a satellite communication network. The WWAN transceiver 212 is operable to communicate with devices positioned at a location remote from the master module 202, such as the communication center 190 shown in FIG. 2. The WWAN transceiver 212 may comprise a very small aperture terminal (VSAT), a cellular network transceiver, a satellite transceiver, and/or other communication devices operable to communicate via a WWAN.

The master module 202 also comprises a wireless local network (WLN) transceiver 214 operable to communicate with other modules having WLN transceivers and located within a communication range of the WLN transceiver 214. For example, the WLN transceiver 214 may comprise a radio communication device. The master module 202 (or the monitor module 204) and the child modules comprising WLN transceivers may collectively form a WLN network.

The master module 202 also comprises a local area network (LAN) transceiver 215 operable for wired communications with other modules having LAN transceivers and connected via appropriate data cables. For example, communications via the LAN transceiver 215 may be via Ethernet. The master module 202 and other devices comprising LAN transceivers may collectively form a LAN network.

The master module 202 also comprises an RFID reader 216 operable to receive data from other modules having RFID tags, such as for identifying the RFID-tagged modules for tracking and/or other purposes. The RFID reader 216 may be an active or passive RFID reader.

The master module 202 also comprises a sensor interface 218. The sensor interface 218 may be operable to connect to and facilitate communication with one or more sensors (not shown) associated with the piece of wellsite equipment that is associated with the master module 202. The sensors and the sensor interface 218 may be operable to provide or generate signals related to operational information or parameters of the associated piece of wellsite equipment, such as operating speed, temperature, pressure, position, and/or other operational parameters.

The master module 202 also comprises an electronic control module (ECM) interface 220. The ECM interface 220 may be operable to connect to and facilitate communication with an ECM (not shown) of the associated piece of wellsite equipment. The ECM and the ECM interface 220 may be operable to provide or generate signals related to operational information or parameters of the associated piece of wellsite equipment, such as engine speed, transmission speed, power output, and/or other operational parameters.

The master module 202 also comprises a global positioning system (GPS) signal receiver 222 operable to receive or acquire location information from a GPS satellite. The GPS signal receiver 222 or another feature of the master module 202 may utilize such location information to determine time-stamped geographical location of the associated piece of wellsite equipment.

Figure 7:
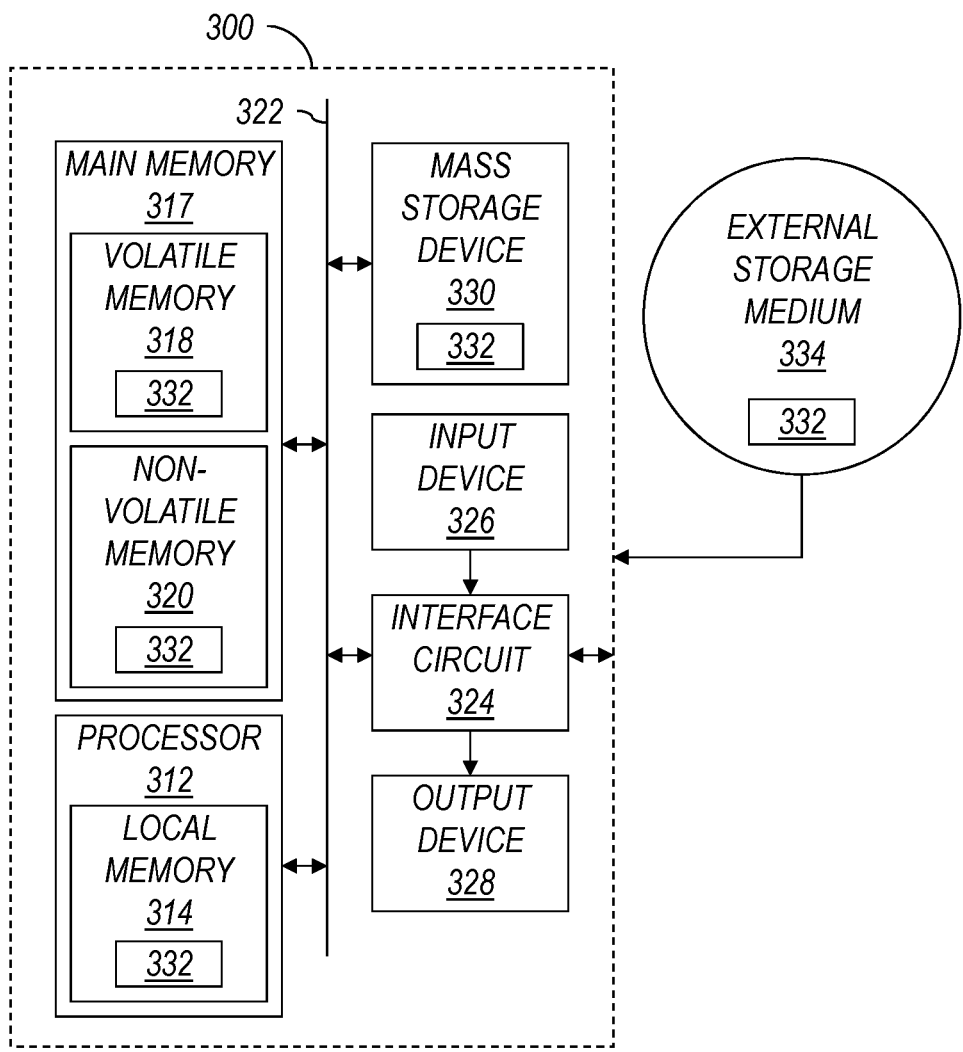
FIG. 7 is a schematic view of at least a portion of an example implementation of the apparatus shown in one or more of FIGS. 3-6 according to one or more aspects of the present disclosure.

The master module 202 also comprises a controller 300 in communication with existing ones of the WWAN transceiver 212, the WLN transceiver 214, the LAN transceiver 215, the RFID reader 216, the sensor interface 218, the ECM interface 220, and the GPS receiver 222 (hereinafter referred to collectively as "the master module communication devices"). The controller 300 may be operable to execute machine-readable instructions to implement at least a portion of one or more methods, processes, and/or systems described herein. FIG. 7 is a schematic view of at least a portion of an example implementation of the controller 300 according to one or more aspects of the present disclosure. The following description refers to FIGS. 3 and 7, collectively.

The controller 300 may be or comprise, for example, one or more general- or special-processors, computing devices, servers, personal computers, personal digital assistant (PDA) devices, smartphones, internet appliances, and/or other types of computing devices. The controller 300 may comprise a processor 312, such as a general-purpose programmable processor. The processor 312 may comprise a local memory 314, and may execute coded instructions 332 present in the local memory 314 and/or another memory device. The coded instructions 332 may include machine-readable instructions or programs to implement the methods and/or processes described herein. For example, the coded instructions 332 may include program instructions or computer program code that, when executed by the processor 312, facilitate the master module 202 to perform methods and/or processes described herein. The processor 312 may be, comprise, or be implemented by one or more processors of various types suitable to the local application environment, and may include one or more general- or special-purpose computers, microprocessors, digital signal processors (DSPs), field-programmable gate arrays (FPGAs), application-specific integrated circuits (ASICs), and processors based on a multi-core processor architecture, among other examples.

The processor 312 may be in communication with a main memory 317, such as via a bus 322 and/or other communication means. The main memory 317 may comprise a volatile memory 318 and/or a non-volatile memory 320. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320. The controller 300 may be operable to store or record the signals or information generated and/or received by the master module 202 on the main memory 317. The controller 300 may be further operable to store or record identification information pertaining to the piece of wellsite equipment associated with the master module 202.

The controller 300 may also comprise an interface circuit 324 to facilitate communications between the controller 300 and the master module communication devices 212, 214, 215, 216, 218, 220, 222. The interface circuit 324 may be, comprise, or be implemented by various types of standard interfaces, such as an Ethernet interface, a universal serial bus (USB) interface, and/or a third generation input/output (3GIO) interface, among other examples. The interface circuit 324 may also comprise a graphics driver card. The interface circuit 324 may also comprise a communication device, such as a modem or network interface card, to facilitate exchange of data with external computing devices via a network (e.g., Ethernet connection, digital subscriber line (DSL), telephone line, coaxial cable, cellular telephone system, satellite, etc.).

One or more input devices 326 may also be connected to the interface circuit 324. The input devices 326 may permit a human operator to enter data and/or commands for operation of the processor 312, other features of the controller 300, and/or other features of the master module 202, such as master module operating parameters described below. The input devices 326 may be, comprise, or be implemented by a keyboard, a mouse, a touchscreen, a track-pad, a trackball, an isopoint, and/or a voice recognition system, among other examples.

One or more output devices 328 may also be connected to the interface circuit 324. The output devices 328 may be, comprise, or be implemented by display devices (e.g., a liquid crystal display (LCD) or cathode ray tube display (CRT), among others), printers, and/or speakers, among other examples.

The controller 300 may also comprise one or more mass storage devices 330 for storing machine-readable instructions and data. Examples of such mass storage devices 330 include hard disk drives, compact disk (CD) drives, and digital versatile disk (DVD) drives, among other examples. The coded instructions 332 may be stored in the mass storage device 330, the volatile memory 318, the non-volatile memory 320, the local memory 314, and/or on a removable storage medium 334, such as a CD or DVD. Thus, the controller 300 may be implemented in accordance with hardware (embodied in one or more chips including an integrated circuit, such as an ASIC), or may be implemented as software or firmware for execution by one or more processors, such as the processor 312. In the case of firmware or software, the embodiment may be provided as a computer program product including a computer-readable medium or storage structure embodying computer program code (i.e., software or firmware) thereon for execution by the processor 312.

The coded instructions 332 may include program instructions or computer program code that, when executed by the processor 312, cause the controller 300 to perform methods and processes as described herein. For example, the coded instructions 332, when executed, may cause the controller 300 to receive, process, and/or record the signals or information generated and/or received by the master module communication devices 212, 214, 215, 216, 218, 220, 222. The coded instructions 332, when executed, may also cause the controller 300 to activate the WWAN transceiver 212, such as to cause the WWAN transceiver 212 to transmit information to a remote device (such as to the communication center 190 shown in FIG. 2), such as for storing, processing, tracking, and/or optimizing the allocation of pieces of wellsite equipment associated with various instances of the child modules that are in communication with the master module 202. Such information may include information received by the master module 202 via the master module communication devices 212, 214, 215, 216, 218, 220, 222, and/or information generated by the master module 202 based on such received information, such as the tracking events described below.

For example, the controller 300 may cause the WWAN transceiver 212 to transmit time-stamped location information acquired via GPS, the identification information of the associated piece of wellsite equipment, and/or the operational information provided by the sensor and ECM interfaces 218, 220. The information may be transmitted periodically, such as at predetermined time intervals ranging between about three minutes and about 24 hours, although other time intervals are also within the scope of the present disclosure. However, if certain information received by the master module 202 is designated as important or high priority information, such high priority information may be transmitted via the WWAN transceiver 212 to the remote device (such as to the communication center 190 shown in FIG. 2) substantially immediately or within a predetermined, relatively short time interval, such as less than about three minutes. The high priority information may include, for example, operational information related to a failure of a key piece of wellsite equipment, such as the mixers 108, 124 shown in FIG. 1, among other examples.

The coded instructions 332, when executed, may also cause the controller 300 to activate the RFID reader 216 to activate an RFID tag of an RFID-tagged module to cause the RFID tag to transmit identification information associated with the RFID-tagged module to the RFID reader 216. The coded instructions 332, when executed, may also cause the controller 300 to receive, process, and/or record the signals or information related to operational parameters received via the sensor and ECM interfaces 218, 220. The coded instructions 332, when executed, may also cause the controller 300 to receive, process, and/or record the signal or information received via the GPS receiver 222, such as to determine the time-stamped geographical location of the associated piece of wellsite equipment.

The master module 202 may be powered via connection with an electrical power circuit of the associated piece of wellsite equipment. However, the master module 202 may also or instead comprise a local energy storage device, such as a battery 231, which may supply the master module 202 with electrical power.

The master module 202 may be associated with a wellsite control center (such as the control center 160 shown in FIG. 1), a wellsite pumping device (such as the pump assemblies 150 shown in FIG. 1), and/or other pieces of wellsite equipment. The master module 202 may also be associated with a structure disposed or erected at a wellsite or other facility, such as at a designated entry point to the wellsite or other facility.

Figure 4:
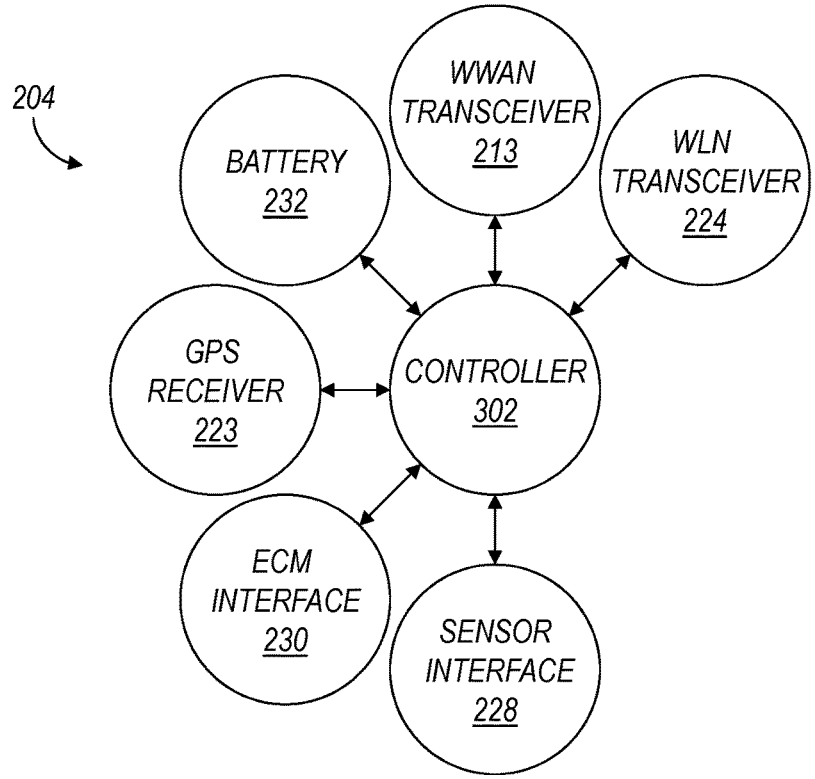
FIG. 4 is a schematic view of at least a portion of an example implementation of apparatus according to one or more aspects of the present disclosure.

FIG. 4 is a schematic view of at least a portion of an example implementation of an instance of the monitor module 204. An instance of the monitor module 204 may be associated with a piece of wellsite equipment located in various geographical locations within the tracking system 200, such as the wellsites 102, 103, the base facility 170, and/or the maintenance shop 180 shown in FIG. 2. A geographical location within the tracking system 200 may include one master module 202, one monitor module 204, or both a master module 202 and a monitor module 204.

The monitor module 204 may have the same or similar structure and/or function as the master module 202, except that the monitor module 204 comprises neither a LAN transceiver nor an RFID reader. Thus, the monitor module 204 comprises a WWAN transceiver 213, a WLN transceiver 224, a sensor interface 228, an ECM interface 230, a GPS receiver 223, and a controller 302, each of which may have the same or similar structure and/or function as the corresponding WWAN transceiver 212, WLN transceiver 214, sensor interface 218, ECM interface 220, GPS receiver 222, and controller 300 described above with respect to the master module 202.

The monitor module 204 may be powered via a connection with an electrical power circuit of the associated piece of wellsite equipment. The monitor module 204 may also or instead comprise an energy storage device, such as a battery 232.

The tracking system 200 may comprise multiple instances of the monitor module 204 each associated with different pieces of wellsite equipment at different geographical locations. For example, instances of the monitor module 204 at different geographical locations within the tracking system 200 may be associated with different ones of the mixers 108, 124, the pump assemblies 150, and/or other pieces of the wellsite equipment shown in FIG. 1 that comprise an ECM and/or sensors generating information related to operational parameters of the associated piece of wellsite equipment.

Figure 5:
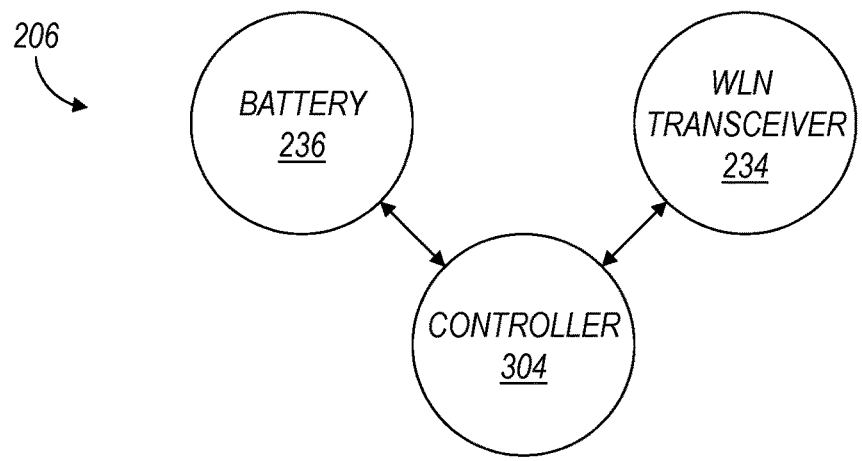
FIG. 5 is a schematic view of at least a portion of an example implementation of apparatus according to one or more aspects of the present disclosure.

FIG. 5 is a schematic view of at least a portion of an example implementation of an instance of the mesh module 206. Multiple instances of the mesh module 206 may be associated with corresponding pieces of wellsite equipment located at each geographical location within the tracking system 200, such as the wellsites 102, 103, the base facility 170, and/or the maintenance shop 180 shown in FIG. 2.

The mesh module 206 comprises a WLN transceiver 234 having the same or similar structure and/or function as the WLN transceivers 214, 224 described above. The WLN transceiver 234 is operable to communicate with instances of the master and monitor modules 202, 204 that are located within a communication range of the WLN transceiver 234. Instances of the mesh module 206, the monitor module 204, the master module 202, and other modules comprising WLN transceivers may collectively form the WLN network described above.

The mesh module 206 also comprises a controller 304 in communication with the WLN transceiver 234, such as may be operable to execute machine-readable instructions to implement at least a portion of one or more methods, processes, and/or systems described herein. The controller 304 may comprise the same or similar structure and/or function as the controller 300 shown in FIG. 7 and described above. Thus, for example, the controller 304 may comprise memory devices for storing coded instructions. The coded instructions may include machine-readable program instructions or computer program code that, when executed, cause the controller 304 to perform methods and processes as described herein.

For example, the coded instructions, when executed, may cause the controller 304 to store or record the signals or information generated and/or received by the WLN transceiver 234 on one or more memory devices. The coded instructions may also cause the controller 304 to activate the WLN transceiver 234 and/or cause the WLN transceiver 234 to transmit the identification information associated with the mesh module 206 and/or the associated piece of wellsite equipment to instances of the master and monitor modules 202, 204 within communication range of the WLN transceiver 234.

The mesh module 206 may be powered via a connection with an electrical power circuit of the associated piece of wellsite equipment. The mesh module 206 may also or instead comprise an energy storage device, such as a battery 236.

The tracking system 200 comprises multiple instances of the mesh module 206, each associated with different pieces of wellsite equipment. For example, different instances of the mesh module 206 may be associated with different ones of the pump assemblies 150, the common manifold 136, the tanks 110, the first containers 112, the second containers 126, and/or other pieces of the wellsite equipment shown in FIG. 1.

Figure 6:
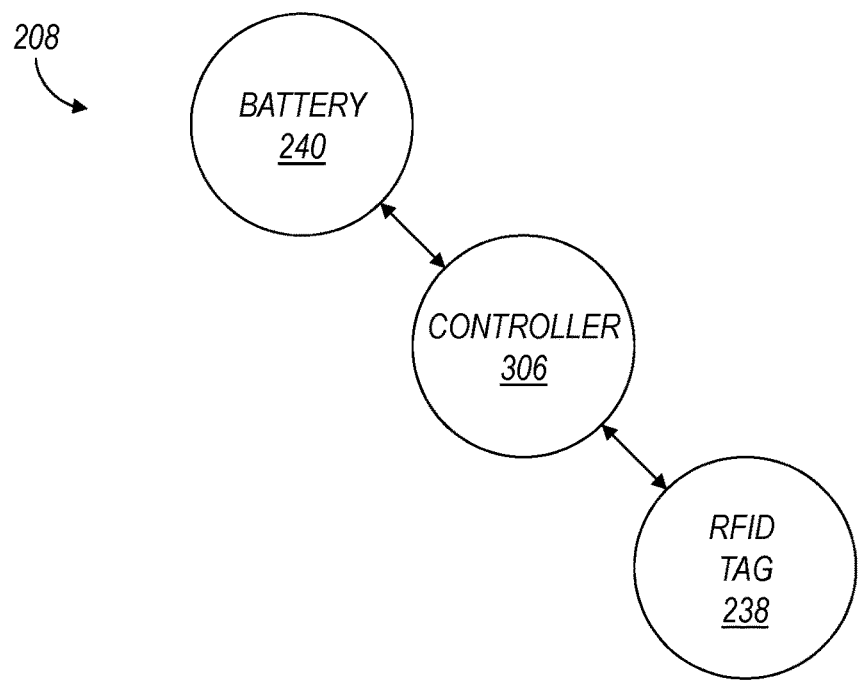
FIG. 6 is a schematic view of at least a portion of an example implementation of apparatus according to one or more aspects of the present disclosure.

FIG. 6 is a schematic view of at least a portion of an example implementation of an instance of the RFID module 208. Multiple instances of the RFID module 208 may be associated with corresponding pieces of wellsite equipment located at each geographical location within the tracking system 200, such as the wellsites 102, 103, the base facility 170, and/or the maintenance shop 180 shown in FIG. 2.

The RFID module 208 comprises an RFID tag 238 operable to transmit identification information associated with the RFID module 208, and/or the associated piece of wellsite equipment, to the RFID reader 216 of the master module 202, such as for identifying and/or detecting the RFID module 208 and, thus, the associated piece of wellsite equipment. The RFID tag 238 may be a passive, active, or battery-assisted passive RFID tag.

The RFID module 208 may also comprise a controller 306 in communication with the RFID tag 238, such as may be operable to execute machine-readable instructions to implement at least a portion of one or more methods, processes, and/or systems described herein. The controller 306 may comprise the same or similar structure and/or function as the controller 300 shown in FIG. 7 and described above. Thus, for example, the controller 306 may comprise memory devices for storing coded instructions. The coded instructions may include machine-readable program instructions or computer program code that, when executed, cause the controller 306 to perform methods and processes as described herein.

For example, the coded instructions, when executed, may cause the controller 306 to activate the RFID tag 238 and/or cause the RFID tag 238 to transmit identification information associated with the RFID module 208, and/or the associated piece of wellsite equipment, to the master module 202. The identification information may be utilized for identifying and/or detecting the presence of the RFID module 208 and, thus, the associated piece of wellsite equipment.

The RFID module 208 may be powered via a connection with an electrical power circuit of the associated piece of wellsite equipment. The RFID module 208 may also or instead comprise an energy storage device, such as a battery 240.

The tracking system 200 comprises multiple instances of the RFID module 208, each associated with different pieces of wellsite equipment. For example, different instances of the RFID module 208 may be associated with different ones of the mixers 108, 124, the control center 160, the pump assemblies 150, the common manifold 136, the tanks 110, the first containers 112, the second containers 126, and/or other pieces of the wellsite equipment shown in FIG. 1.

The RFID module 208 may be an off-the-shelf RFID device, including those in which the controller 306 and the RFID tag 238 are integrated as a single discrete device, whether with or without the battery 240. The RFID module 208 may also comprise just the RFID tag 238, such as in implementations in which the RFID module 208 is simply an off-the-shelf RFID tag lacking a controller as described herein. Such implementations may include off-the-shelf passive, active, and/or battery-assisted passive RFID tags.

Figure 8:
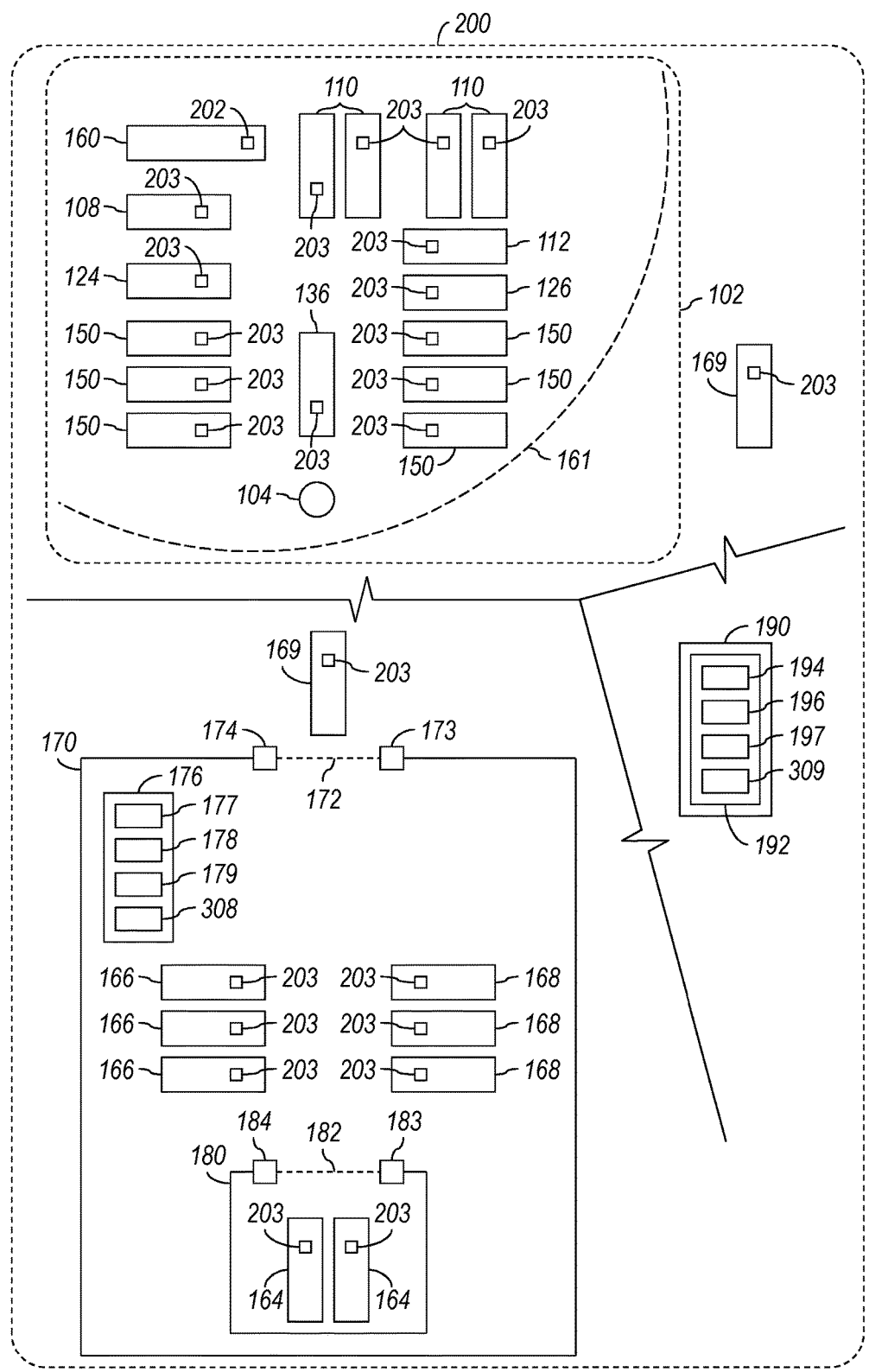
FIG. 8 is a schematic view of at least a portion of an example implementation of apparatus according to one or more aspects of the present disclosure.

FIG. 8 is a schematic view of at least a portion of an example implementation of the tracking system 200 shown in FIG. 2. The example environment in which the tracking system 200 is depicted includes example implementations of the wellsite 102, the base facility 170, the maintenance shop 180, and the communication center 190, which may be geographically located at substantial distances from each other.

It is noted that while the following description may refer to "the" wellsite 102, "the" base facility 170, and "the" maintenance shop 180, it is to be understood that such references are solely for the sake of clarity and ease of understanding. That is, the aspects described below are equally applicable to other implementations of the tracking system 200 that are utilized in conjunction with multiple wellsites, base facilities, and maintenance shops, and similarly within the scope of the present disclosure. In such implementations, each wellsite 102 may have an instance of the master module 202 and/or the monitor module 204, and each base facility 170 may have an instance of a communication device or system, referred to hereinafter as a facility module 176. The facility module 176 may have one or more aspects in common with the master module 202, including as described below, and in some implementations may substantially be an instance of the master module 202.

The example pieces of wellsite equipment located at the wellsite 102 depicted in FIG. 8 include the tanks 110, the first and second containers 112, 126, the first and second mixers 108, 124, the pump assemblies 150, the common manifold 136, and the control center 160. The master module 202 is associated with the control center 160. Instances of the child modules, including of the mesh module 206 and the RFID module 208, are each generally designated in FIG. 8 by reference number 203, and are associated with corresponding other pieces of wellsite equipment at the wellsite 102 (i.e., pieces of wellsite equipment other than the control center 160). It is noted that, in some implementations, each piece of wellsite equipment may have an RFID device of some type.

The base facility 170 may be utilized for storing the wellsite equipment between jobs, while awaiting deployment to a job, and/or while awaiting maintenance to be performed. The base facility 170 may comprise an entrance or a gateway 172 and one or more facility RFID readers 174 disposed in association with the gateway 172 or at another location of the base facility 170. The RFID readers 174 may comprise the same or similar structure and/or function as the RFID reader 216 of the master module 202. The RFID readers 174 may be operable to receive identification information from the RFID tags of the child modules 203. Such information may be utilized to detect the presence and/or movement of the associated pieces of wellsite equipment through the gateway 172, such as to monitor when pieces of wellsite equipment enter and leave the base facility 170. The base facility 170 may also comprise an RFID marker 173 operable to generate a location identifier, such that RFID-equipped devices that pass through a signal area of the RFID marker 173 may associate their own identifier with the location identifier generated by the RFID marker 173 and emit a wireless signal, indicative of both identifiers, that is detected by the RFID reader 174. The RFID marker 173 may be located near the RFID reader 174, such as within a wireless communication range. The base facility 170 may also comprise multiple RFID markers 173 that each communicate with a single RFID reader 174 of the base facility 170.

The maintenance shop 180 may house or otherwise contain the wellsite equipment undergoing maintenance. The maintenance shop 180 may comprise an entrance or a gateway 182 and one or more additional facility RFID readers 184 disposed in association with the gateway 182 or at another location of the maintenance shop 180. The RFID readers 184 may comprise the same or similar structure and/or function as the RFID reader 216 of the master module 202. The RFID readers 184 may be operable to receive identification information from the RFID tags of the child modules 203. Such information may be utilized to detect the presence and/or movement of the associated pieces of wellsite equipment through the gateway 182, such as to monitor when pieces of wellsite equipment enter and leave the maintenance shop 180. The maintenance shop 180 may also comprise one or more RFID markers 183 similar to the RFID markers 173 but operable with respect to the maintenance shop 180 as the location instead of the base facility 170.

FIG. 8 also depicts several pieces of wellsite equipment 164 undergoing maintenance within the maintenance shop 184, several pieces of wellsite equipment 166 waiting for maintenance to be performed, several pieces of wellsite equipment 168 waiting to be deployed to the wellsite 102 or another location, and a piece of wellsite equipment 169 that has left the base facility 170 for transport to the wellsite 102 or another location. Such classifications are further described below.

One or more facility modules 176 may be installed at the base facility 170 to receive the information generated by the facility RFID readers 174, 184 and transmit such information to a server 192 housed within the communication center 190. Although the facility module 176 is shown located at a distance from the RFID readers 174, 184, the facility module 176 may be adjacent to or part of the same system or device comprising the RFID readers 174, 184. Furthermore, although the communication center 190 is shown located at a distance from the base facility 170, the communication center 190 may be located within the base facility 170. If the communication center 190 is located within the base facility 170, the facility module 176 may utilize a WLN transceiver 177 to communicate with the server 192. The WLN transceiver 177 may comprise the same or similar structure and/or function as the WLN transceiver 214 described above. If the communication center 190 is located a substantial distance from the base facility 170, the facility module 176 may utilize a WWAN transceiver 178 to communicate with the server 192. The WWAN transceiver 178 may comprise the same or similar structure and/or function as the WWAN transceiver 212 described above. The facility module 176 may also comprise a LAN transceiver 179, which may comprise the same or similar structure and/or function as the LAN transceiver 215 described above.

The facility module 176 may also comprise a controller 308 in communication with the WLN, WWAN, and LAN transceivers 177, 178, 179, such as may be operable to execute machine-readable instructions to implement at least a portion of one or more methods, processes, and/or systems described herein. The controller 308 may comprise the same or similar structure and/or function as the controller 300 shown in FIG. 7 and described above. Thus, for example, the controller 308 may comprise memory devices for storing coded instructions. The coded instructions may include machine-readable program instructions or computer program code that, when executed, cause the controller 308 to perform methods and processes as described herein.

For example, when executed, the coded instructions may cause the controller 308 to store or record the signals or information received or generated by the facility RFID readers 174, 184 on one or more memory devices. The coded instructions, when executed, may also cause the controller 308 to activate the WLN, WWAN, and/or LAN transceivers 177, 178, 179, such as to cause the WLN, WWAN, and/or LAN transceivers 177, 178, 179 to transmit the information received from the RFID readers 174, 184 to the server 192. The information may be transmitted to the server 192 periodically at predetermined time intervals ranging between about three minutes and about sixty minutes, although other time intervals are also within the scope of the present disclosure.

At the communication center 190, the server 192 may be operable to receive information transmitted by the master module 202 and/or the monitor module 204 at the wellsite 102, the facility module 176 at the base facility 170, and other instances of the master module 202, the monitor module 204, and/or the facility module 176 at other geographical locations within the tracking system 200 (not shown in FIG. 8). The server 192 may comprise a WLN transceiver 194 and/or a WWAN transceiver 196 operable for such communication. The WLN and WWAN transceivers 194, 186 may comprise the same or similar structure and/or function as the above-described WLN and WWAN transceivers 214, 212, respectively. The communication center 190 may also comprise a LAN transceiver 197, which may comprise the same or similar structure and/or function as the LAN transceiver 215 described above.

The server 192 also comprises a controller 309 in communication with the WLN, WWAN, and LAN transceivers 194, 196, 197, such as may be operable to execute machine-readable instructions to implement at least a portion of one or more methods, processes, and/or systems described in the present disclosure. The controller 309 may comprise the same or similar structure and/or function as the controller 300 shown in FIG. 7 and described above. Thus, for example, the controller 309 may comprise memory devices for storing coded instructions. The coded instructions may include machine-readable program instructions or computer program code that, when executed, cause the controller 309 to perform methods and processes as described herein. Multiple servers 192 may be utilized for tracking and utilization computation according to aspects of the present disclosure.

For example, when executed, the coded instructions may cause the controller 309 to perform a method or process (hereinafter referred to as a "tracking method") for tracking or determining the location, movement, and/or utilization status of pieces of wellsite equipment that are deployed at the wellsite 102, stored at the base facility 170, undergoing maintenance at the maintenance shop 180, and/or being transported between such locations. The tracking method may be implemented utilizing the tracking system 200. The following description introduces an example implementation of the tracking method, which may be performed by or in conjunction with the controller 309 and/or other portions of the tracking system 200.

The information received by the server 192 from the various instances of the master module 202, the monitor module 204, and the facility module 176 may include location and identification information of the associated pieces wellsite equipment, as well as a time (e.g., a timestamp) associated with the transmission of such information. The location, identification, and time information may be utilized to designate, assign, or determine operational or utilization states (hereinafter referred to as "utilization states") of each piece of wellsite equipment as part of the tracking method according to one or more aspects of the present disclosure. The information received by the server 192 may also include one or more of the tracking events described below, such as in implementations in which instances of the master module 202, the monitor module 204, and/or the facility module 176 generate the tracking events.

Table 1 set forth below lists example utilization states and corresponding identifiers that may be determined for a tracked piece of wellsite equipment.

TABLE 1

| Utilization State | Identifier |
| --- | --- |
| Awaiting maintenance | A |
| Conducting maintenance | M |
| Waiting for deployment | B |
| Conducting wellsite job | J |
| Moving between locations | RD |

The pieces of wellsite equipment 166 that are located in the base facility 170 and awaiting repairs or maintenance at the maintenance shop 180 are in the "awaiting maintenance" utilization state, and are identified in the tracking method by the "A" identifier. The pieces of wellsite equipment 164 that are located in the maintenance shop 180, and thus undergoing repair or maintenance, are in the "conducting maintenance" utilization state, and are identified in the tracking method by the "M" identifier. The pieces of wellsite equipment 168 that are located in the base facility 170 and ready to be deployed to the wellsite 102 or other locations, such as after having undergone repair or maintenance in the maintenance shop 180, are in the "waiting for deployment" utilization state, and are identified in the tracking method by the "B" identifier. The pieces of wellsite equipment at the wellsite 102 (such as the wellsite equipment 108, 110, 112, 124, 126, 136, 150, 160) are in the "conducting wellsite job" utilization state, and are identified in the tracking method by the "J" identifier. The pieces of wellsite equipment 169 that are being transported between locations (such as between the base facility 170 and the wellsite 102) are in the "moving between locations" utilization state, and are identified in the tracking method by the "RD" identifier.

To determine the utilization state of each piece of tracked wellsite equipment, an operational or movement event (hereinafter referred to as a "tracking event") may be determined for each piece of wellsite equipment. The tracking events may be determined by instances of the parent modules, the communication center 190, or both, and are determined based on information received from the child modules. Tracking events may identify actions associated with a piece of wellsite equipment based on location and direction of movement of the wellsite equipment. Table 2 set forth below lists example tracking events and corresponding identifiers that may be determined for each piece of wellsite equipment.

TABLE 2

| Tracking Event | Identifier |
| --- | --- |
| Entering base | BI |
| Exiting base | BO |
| Entering maintenance shop | MI |
| Exiting maintenance shop | MO |
| Starting job | JS |
| Ending job | JE |

An "entering base" tracking event occurs when a piece of wellsite equipment enters the base facility 170 through the gateway 172, and is identified in the tracking method by the "BI" identifier. An "exiting base" tracking event occurs when a piece of wellsite equipment exits the base facility 170 through the gateway 172, and is identified in the tracking method by the "BO" identifier. An "entering maintenance shop" tracking event occurs when a piece of wellsite equipment enters the maintenance shop 180 through the gateway 182, and is identified in the tracking method by the "MI" identifier. An "exiting maintenance shop" tracking event occurs when a piece of wellsite equipment exits the maintenance shop 180 through the gateway 182, and is identified in the tracking method by the "MO" identifier. A "starting job" tracking event occurs when it is determined that a piece of wellsite equipment has started operating at the wellsite 102, and is identified in the tracking method by the "JS" identifier. An "ending job" tracking event occurs when it is determined that a piece of wellsite equipment has ended operating at the wellsite 102, and is identified by the "JE" identifier.

For the sake of simplicity and ease of understanding, the master module 202, the monitor module 204, and the facility module 176 are hereinafter referred to as "parent modules." Also, the master module 202 and the monitor module 204 are hereinafter referred to as "portable parent modules" because these two types of parent modules are associated with wellsite equipment that is truck-mounted, skidded, or otherwise portable between geographical locations within the tracking system 200.

Determining the utilization state for a tracked piece of wellsite equipment based on the tracking events may differ depending on the type of module 202, 204, 206, 208 that is associated with the piece of wellsite equipment, the type of the piece of wellsite equipment, and the location of the piece of wellsite equipment. For a piece of wellsite equipment that is associated with a portable parent module, the utilization state may be determined based on two consecutive tracking events of the parent modules. For example, utilization states may be determined based on facility module events (BI, BO, MI, MO) and/or portable parent module events (JS, JE). Table 3 set forth below lists examples of the determined utilization state ("DUS") of a piece of wellsite equipment associated with a portable parent module during the time interval between a first tracking event ("$1^{st}$ TE") and a second tracking event ("$2^{nd}$ TE").

TABLE 3

| $1^{st}$ TE | $2^{nd}$ TE | DUS |
| --- | --- | --- |
| BI | MI | A |
| BI | BO | A |
| BO | BI | RD |
| MI | MO | M |
| MO | BO | B |
| BO | JS | RD |
| JS | JE | J |
| BO | JE | J |
| JS | BI | J |
| JE | BI | RD |
| JE | JS | RD |

Figure 9:
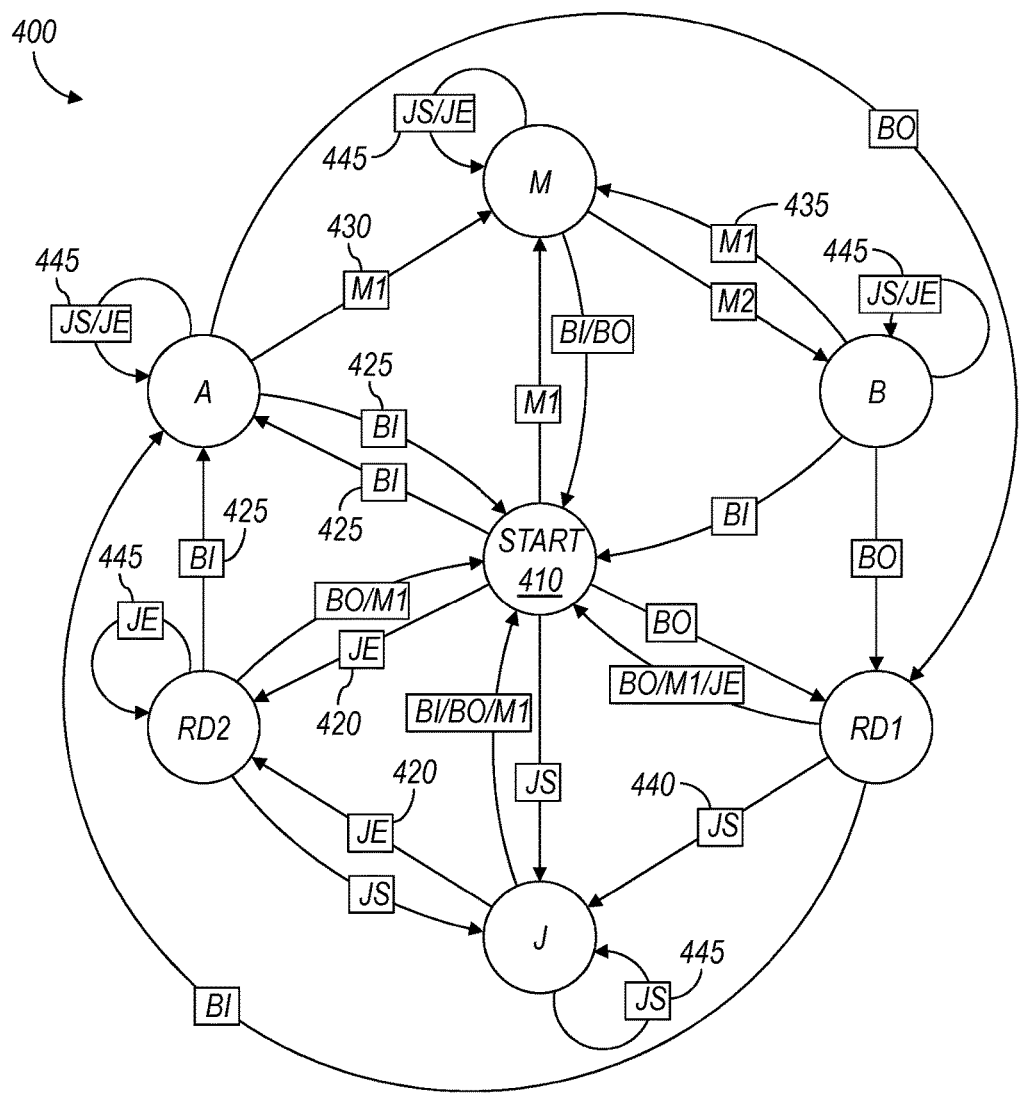
FIG. 9 is a state diagram of at least a portion of an example implementation of a method according to one or more aspects of the present disclosure.

FIG. 9 is a state diagram of an example logic scheme 400 for determining the utilization state of a piece of wellsite equipment associated with a portable parent module between two consecutive tracking events detected by parent modules in association with that portable parent module. The example logic scheme 400 implements the examples set forth above in Table 3, among others.

The logic scheme 400 may be utilized for establishing relationships between the above-described utilization states A, M, B, RD, and J and the above-described tracking events BI, BO, JS, and JE. However, the example logic scheme 400 depicted in FIG. 9 includes two utilization states specifying direction of movement (of the piece of wellsite equipment associated with the portable parent module) between locations, including a utilization state RD1 for when the piece of wellsite equipment has left the base 170 and is moving to the wellsite 102, and another utilization state RD2 for when the piece of wellsite equipment has left the wellsite 102 and is moving to the base 170. The example logic scheme 400 also includes two tracking events M1, M2 for scenarios in which a maintenance-related tracking event is detected in association with the portable parent module, but it is not known whether the event is an MI event or an MO event.

The example logic scheme 400 depicts a "START" 410, indicating a starting point at which the latest utilization state is designated as invalid and the logic commences based on the latest tracking event. As described above, for a piece of wellsite equipment associated with a portable parent module, the utilization state for that piece of wellsite equipment is determined based on the latest two tracking events. Thus, for example, if the two latest tracking events are a JE tracking event 420 followed by a BI tracking event 425, then the piece of wellsite equipment is determined to have been in utilization state RD2 during the period of time between the detection of the JE tracking event 420 and the subsequent detection of the BI tracking event 425. Similarly, if a BI tracking event 425 is followed by an MI tracking event 430, then the piece of wellsite equipment is determined to have been in utilization state A during the period of time between the detection of the BI tracking event 425 and the subsequent detection of the MI tracking event 430.

However, for asset utilization tracking purposes, the example logic scheme 400 may include some exceptions. For example, if an M1 tracking event 435 is detected for a piece of wellsite equipment in utilization state B, the utilization state may be changed to utilization state A. If a piece of wellsite equipment is in utilization state A and transitions to utilization state RD1 because of a BO event, and then later transitions to utilization state J because of a JS event, then the previous utilization state A becomes utilization state B because the time elapsed in utilization state A becomes the time waiting for deployment, not waiting for maintenance. Detected JS or JE tracking events 445 are for a piece of wellsite equipment in utilization states A, B, and M.

As described above, the example logic scheme 400 depicted in FIG. 9 is applicable to pieces of wellsite equipment associated with corresponding instances of the portable parent modules. However, for a piece of wellsite equipment that is not associated with a portable parent module, but is instead associated with just an RFID module 208, the utilization state may be determined based on the two latest tracking events if the tracking events indicate that the piece of wellsite equipment has entered or exited the base facility 170 or the maintenance shop 180. That is, each RFID module 208 comprises an RFID tag 238, such that each movement of the associated piece of wellsite equipment into or from the base facility 170 and/or the maintenance shop 180 (e.g., via the respective gateways 172, 182) may be detected by the respective facility RFID readers 174, 184.

For a piece of wellsite equipment that is associated with a mesh module 206 and that is entering or exiting the wellsite 102, the utilization state may be determined based on detection of the mesh module 206 by the master module 202 at the wellsite 102. For example, a master module 202 associated with a piece of wellsite equipment at the wellsite 102 may detect mesh modules 206 associated with other pieces of wellsite equipment located at the wellsite 102, such as by receiving identification information transmitted from the mesh modules 206 via the WLN transceivers 234.

The WLN transceivers 214, 224, 234 have limited range of communication, so detection by a portable parent module at the wellsite 102 logically provides that the detected mesh modules 206 are also located at the wellsite 102. FIG. 8 shows an example communication range 161 of the WLN transceivers 214, 224, 234 with respect to the master module 202 or the monitor module 204 disposed in association with the control center 160, wherein the master module 202 or the monitor module 204 may detect the mesh modules 206 that are associated with pieces of wellsite equipment that are located within the communication range 161. The communication range 161 may be about 300 meters, for example.

When a portable parent module receives identification information from a child module associated with a piece of wellsite equipment within the communication range 161, and the latest tracking event associated with the portable parent module is a JS tracking event, the piece of wellsite equipment associated with the detected child module is determined to be in utilization state J. Detection of the child module by the portable parent module for the purpose of determining that the associated piece of wellsite equipment is in utilization state J may comprise detecting the child mesh module twice within a predetermined period of time. The predetermined period of time may range between about thirty minutes and about 24 hours, among other time periods also within the scope of the present disclosure.

The tracking method for determining the utilization status of wellsite equipment may also take into account whether multiple portable parent modules are located at the wellsite 102. For example, two (or more) portable parent modules may detect the same child module in adjacent time periods. In such situations, if the latest tracking event associated with either portable parent module is a JS tracking event, then the piece of wellsite equipment associated with the detected child module may be determined to be in utilization state J. Furthermore, in implementations in which detection of the child module comprises two detections within a predetermined period of time, one of the two detections may be by one of the portable parent modules, and the other of the two detections may be by the other portable parent module.

The tracking method for determining the utilization status of wellsite equipment may also take into account whether a portable parent module is moving between locations. For example, a portable parent module that is associated with a piece of wellsite equipment moving between locations may detect child modules associated with other pieces of wellsite equipment also moving between the locations along with the piece of wellsite equipment associated with the portable parent module. As described above, a portable parent module may detect a child module if the portable parent module is located within the WLN or RFID communication range of the child module. When the portable parent module receives the identification information from a child module, the portable parent module transmits that identification information, the identification information of the portable parent module, and location information of the portable parent module to the communication center 190. If the location of the portable parent module is determined to be outside of the wellsite 102, the base facility 170, or the maintenance shop 180, the piece of wellsite equipment associated with the detected child module is determined to be in utilization state RD. Also, if the latest tracking event associated with the portable parent module is a JE tracking event, the piece of wellsite equipment associated with the detected child module is also determined to be in utilization state RD.

For a piece of wellsite equipment that is associated with an RFID module 208 and that is located outside of the base facility 170 and the maintenance shop 180, the utilization state may be determined based on the amount of time that the piece of equipment has been outside of the base facility 170 and the maintenance shop 180. For example, such equipment may be determined to be in utilization state RD if the amount of time is less than a predetermined time period, such as may range between about one hour and about four hours. Such equipment may also be determined to be in utilization state J after being in utilization state RD longer than the predetermined time period. For example, if the time between consecutive BO and BI tracking events is longer than the predetermined period of time, the wellsite equipment may be determined to be in utilization state J between the consecutive BO and BI tracking events.

Figure 10:
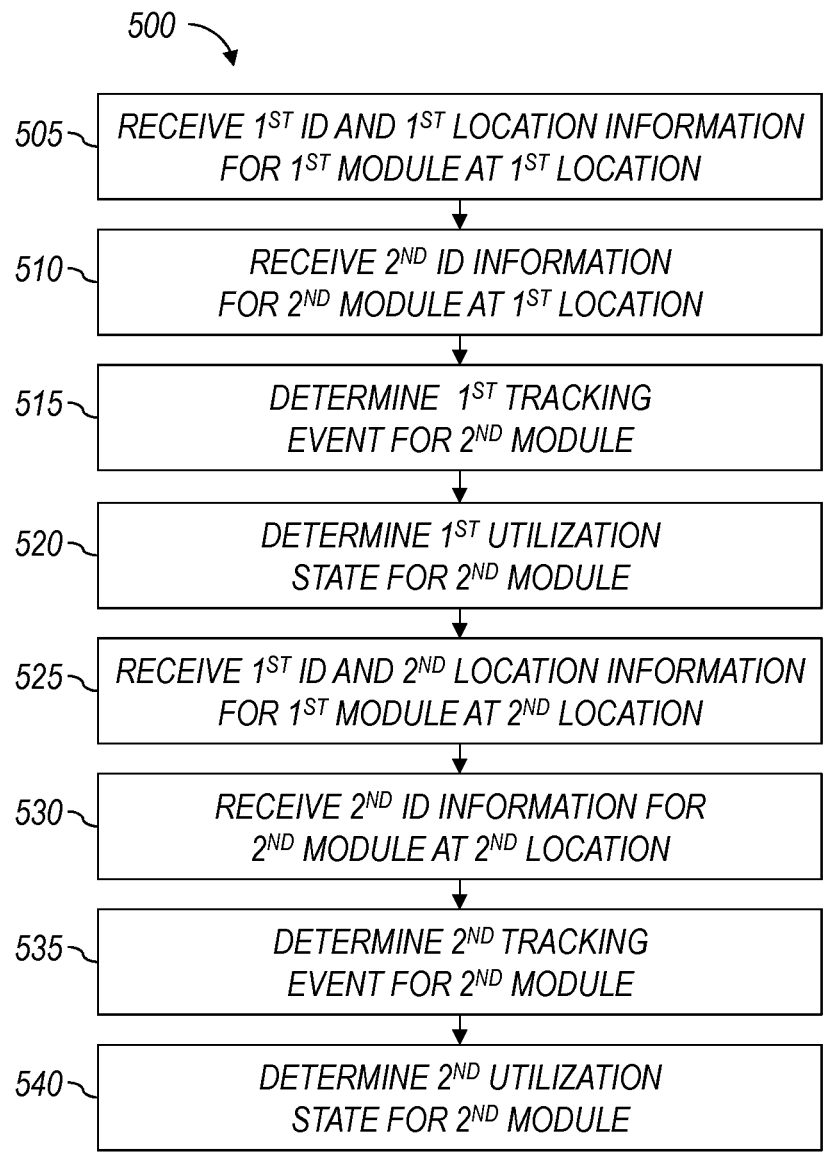
FIG. 10 is a flow-chart diagram of at least a portion of an example implementation of a method according to one or more aspects of the present disclosure.

FIG. 10 is a flow-chart diagram of at least a portion of an example implementation of a method (500) according to one or more aspects of the present disclosure. The method (500) may be performed utilizing at least a portion of one or more implementations of one or more instances of the apparatus shown in one or more of FIGS. 1-8 and/or otherwise within the scope of the present disclosure.

The method (500) comprises receiving (505) first identification information and first location information for a first module. The first module may be a portable parent module, and is associated with a first piece of wellsite equipment (such as the control center 160) at a first location. The first location may be the wellsite 102, the base facility 170, the maintenance shop 180, or on the road, among other examples.

The method (500) also comprises receiving (510) second identification information for a second module. The second module may be a child module, and is associated with a second piece of wellsite equipment (e.g., a pump assembly 150, the common manifold 136, a tank 110, a first container 112, a second container 126, etc.) at the first location. Receiving (510) the second identification information may comprise receiving the second identification information via the first module.

Receiving (505) the first identification information and the first location information and receiving (510) the second identification information may occur at predetermined time intervals. For example, the predetermined time intervals may each range between about three minutes and about 24 hours.

A first tracking event associated with the second piece of wellsite equipment is then determined (515) based on at least the received (505) first identification information and first location information and the received (510) second identification information. As described above, the first tracking event may be selected from the group consisting of: entering a base facility, exiting a base facility, entering a maintenance facility, exiting a maintenance facility, starting a job, and ending a job. The first tracking event may be determined (515) by the first module. In other implementations of the method (500), determining (515) the first tracking event may merely be receiving the first tracking event by another device disposed at a geographical location remote from the first and second modules, such as the communication center 190 described above. Thus, for example, the parent module may generate and transmit the first tracking event, which is then received by the remote communication center, or the remote communication center itself may generate the tracking event. Both such implementations are considered to be included in the determining (515) of the first tracking event depicted in FIG. 10.

A first utilization state associated with the second piece of wellsite equipment is then determined (520) based on at least the determined (515) first tracking event. As described above, the determined (520) first utilization state may be selected from the group consisting of awaiting maintenance, performing maintenance, waiting for deployment, performing a job, and moving between locations. Determining (520) the first utilization state may utilize the logic scheme depicted in FIG. 9 and/or other logic described above, such as where the first utilization state may be determined (520) based on the determined (515) first tracking event and at least one additional tracking event that occurred prior to the determined (515) first tracking event. The first utilization state may be determined (520) by a controller disposed at a geographical location remote from the first and second modules, such as of the communication center 190 described above.

The method (500) may also comprise receiving (525) the first identification information and second location information for the first module when the first piece of wellsite equipment is at a location other than the first location, which will be referred to as the second location in the following description of FIG. 10. The second location may be a different one of the wellsite 102, the base facility 170, the maintenance shop 180, or on the road, relative to the first location. In such implementations, the method (500) also comprises receiving (530) the second identification information for the second module when the second piece of wellsite equipment is at the second location. A second tracking event associated with the second piece of wellsite equipment may then be determined (535) based on at least the received (525) first identification information and second location information and the received (530) second identification information. As described above with respect to determining (515) the first tracking event, determining (535) the second tracking event may include the generation of the second tracking event by the first (parent) module, the receipt of the second tracking event by the remote communication center, or the generation of the second tracking event by the remote communication center.

A second utilization state associated with the second piece of wellsite equipment may then be determined (540) based on at least the determined (535) second tracking event. Determining (540) the second utilization state may utilize the logic scheme depicted in FIG. 9 and/or other logic described above, such as where the second utilization state may be determined (540) based on the determined (515) first tracking event and the determined (535) second tracking event.

Figure 11:
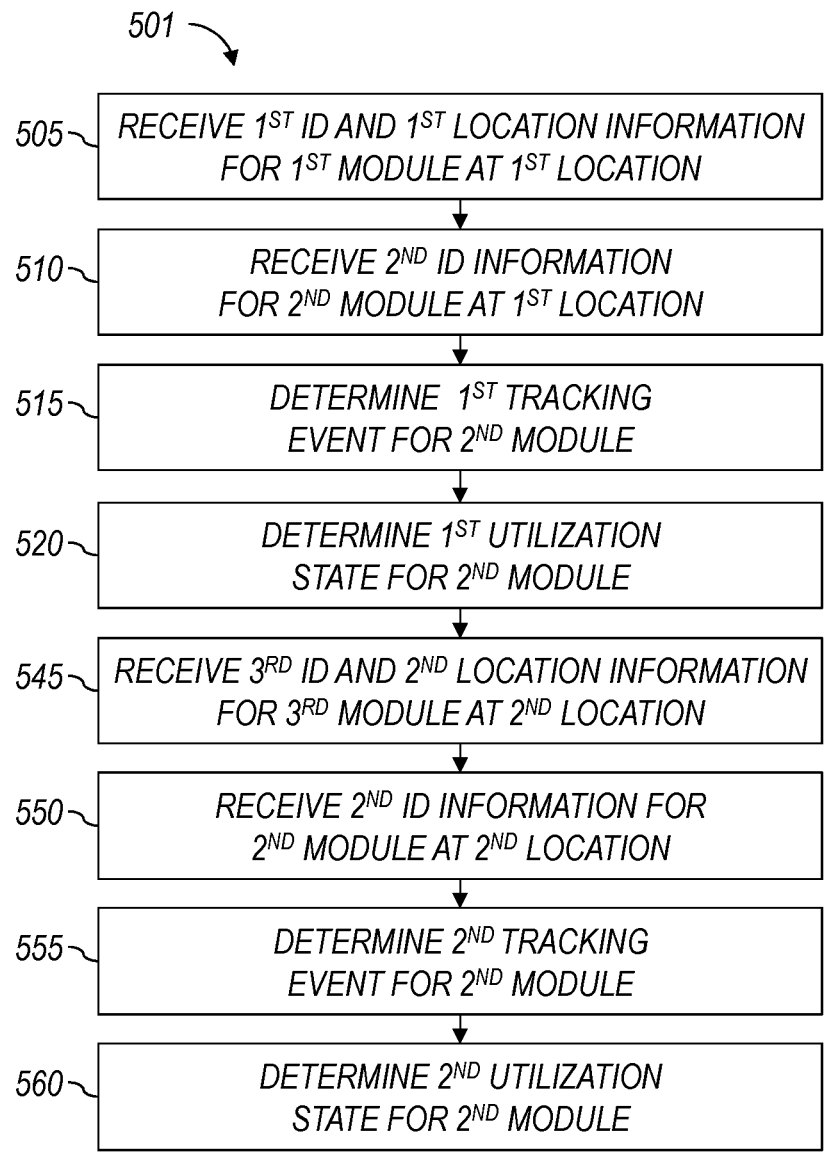
FIG. 11 is a flow-chart diagram of at least a portion of another example implementation of a method according to one or more aspects of the present disclosure.

FIG. 11 is a flow-chart diagram of at least a portion of another example implementation of a method (501) according to one or more aspects of the present disclosure. The method (501) may be performed utilizing at least a portion of one or more implementations of one or more instances of the apparatus shown in one or more of FIGS. 1-8 and/or otherwise within the scope of the present disclosure.

The method (501) comprises some of the actions of the method (500). For example, the method (501) comprises receiving (505) first identification information and first location information for a first module, receiving (510) second identification information for a second module, determining (515) a first tracking event associated with the second piece of wellsite equipment, and determining (520) a first utilization state associated with the second piece of wellsite equipment.

The method (501) also comprise receiving (545) third identification information and second location information for a third module. The third module may be associated with a third piece of wellsite equipment at a location other than the first location, which will be referred to in the following description of FIG. 11 as the second location. It is noted that the second location described below in relation to FIG. 11 may be the same or different than the second location described above in relation to FIG. 10.

The method (501) also comprises receiving (550) the second identification information for the second module when the second piece of wellsite equipment is at the second location. A second (relative to FIG. 11) tracking event associated with the second piece of wellsite equipment may then be determined (555) based on the received (545) third identification information and second location information and the received (550) second identification information. As described above, determining (555) the second tracking event may include the generation of the second tracking event by the third (parent) module, the receipt of the second tracking event by the remote communication center, or the generation of the second tracking event by the remote communication center. A second (relative to FIG. 11) utilization state associated with the second piece of wellsite equipment may then be determined (560) based on at least the determined (555) second tracking event. Determining (560) such utilization state may utilize the logic scheme depicted in FIG. 9 and/or other logic described above, such as where the utilization state may be determined (560) based on the determined (515) first tracking event and the determined (555) second tracking event.

Determining the first tracking event, the subsequent tracking event, and the corresponding utilization state may be one of the following scenarios: determining the first tracking event to be entry of the second piece of wellsite equipment into a base facility, determining the second tracking event to be entry of the second piece of wellsite equipment into a maintenance facility, and determining the second utilization state to be awaiting maintenance; determining the first tracking event to be entry of the second piece of wellsite equipment into the base facility, determining the second tracking event to be exit of the second piece of wellsite equipment from the base facility, and determining the second utilization state to be awaiting maintenance; determining the first tracking event to be exit of the second piece of wellsite equipment from the base facility, determining the second tracking event to be entry of the second piece of wellsite equipment into the base facility, and determining the second utilization state to be moving between the first and second locations; determining the first tracking event to be entry of the second piece of wellsite equipment into the maintenance facility, determining the second tracking event to be exit of the second piece of wellsite equipment from the maintenance facility, and determining the second utilization state to be conducting maintenance; determining the first tracking event to be exit of the second piece of wellsite equipment from the maintenance facility, determining the second tracking event to be exit of the second piece of wellsite equipment from the base facility, and determining the second utilization state to be waiting for deployment; determining the first tracking event to be exit of the second piece of wellsite equipment from the base facility, determining the second tracking event to be a job start of the second piece of wellsite equipment, and determining the second utilization state to be moving between the first and second locations; determining the first tracking event to be a job start of the second piece of wellsite equipment, determining the second tracking event to be a job end of the second piece of wellsite equipment, and determining the second utilization state to be performing a job; determining the first tracking event to be exit of the second piece of wellsite equipment from the base facility, determining the second tracking event to be a job end of the second piece of wellsite equipment, and determining the second utilization state to be performing a job; determining the first tracking event to be a job start of the second piece of wellsite equipment, determining the second tracking event to be entry of the second piece of wellsite equipment into the base facility, and determining the second utilization state to be performing a job; determining the first tracking event to be a job end of the second piece of wellsite equipment, determining the second tracking event to be entry of the second piece of wellsite equipment into the base facility, and determining the second utilization state to be moving between the first and second locations; or determining the first tracking event to be a job end of the second piece of wellsite equipment, determining the first tracking event to be a job start of the second piece of wellsite equipment, and determining the second utilization state to be moving between the first and second locations. Determining the first tracking event, the subsequent tracking event, and the corresponding utilization state may be limited to such scenarios.

In view of the entirety of the present disclosure, including the figures and the claims, a person having ordinary skill in the art should readily recognize that the present disclosure introduces a method comprising: receiving first identification information and first location information for a first module, wherein the first module is associated with a first piece of wellsite equipment, and wherein the first piece of wellsite equipment is at a location; receiving second identification information for a second module, wherein the second module is associated with a second piece of wellsite equipment, and wherein the second piece of wellsite equipment is at the location; and determining a tracking event associated with the second piece of wellsite equipment, wherein the tracking event is based on the first identification information, the first location information, and the second identification information.

The method may further comprise determining a utilization state associated with the second piece of wellsite equipment. Determining the utilization state may be based on the tracking event.

Determining the utilization state may be performed by a first device, and determining the tracking event may comprise receiving the tracking event at the first device after transmission of the tracking event from a second device.

The utilization state may be selected from the group consisting of: awaiting maintenance; performing maintenance; waiting for deployment; performing a job; and moving between locations.

Receiving the second identification information may comprise receiving the second identification information via the first module.

Receiving the first identification information and the first location information and receiving the second identification information may occur at predetermined time intervals. The predetermined time intervals may each range between about three minutes and about 24 hours.

The tracking event may be a first tracking event, the location may be a first location, and the method may further comprise: receiving the first identification information and second location information for the first module when the first piece of wellsite equipment is at a second location; receiving the second identification information for the second module when the second piece of wellsite equipment is at the second location; and determining a second tracking event associated with the second piece of wellsite equipment, wherein the second tracking event is based on the first identification information, the second location information, and the second identification information. In such implementations, among others within the scope of the present disclosure, the method may further comprise: determining a first utilization state associated with the second piece of wellsite equipment, wherein determining the first utilization state is based on the first tracking event; and determining a second utilization state associated with the second piece of wellsite equipment, wherein determining the second utilization state is based on the second tracking event.

The tracking event may be a first tracking event, the location may be a first location, and the method may further comprise: receiving third identification information and second location information for a third module, wherein the third module is associated with a third piece of wellsite equipment, and wherein the third piece of wellsite equipment is at a second location; receiving the second identification information for the second module when the second piece of wellsite equipment is at the second location; and determining a second tracking event associated with the second piece of wellsite equipment, wherein the second tracking event is based on the third identification information, the second location information, and the second identification information. In such implementations, among others within the scope of the present disclosure, the method may further comprise: determining a first utilization state associated with the second piece of wellsite equipment, wherein determining the first utilization state is based on the first tracking event; and determining a second utilization state associated with the second piece of wellsite equipment, wherein determining the second utilization state is based on the second tracking event.

The present disclosure also introduces a system for tracking a plurality of components associated with a wellsite, comprising: a child module associated with a first component and comprising a child module controller operable to control the child module to transmit identification information of the first component via a wireless local network (WLN) transceiver or a radio frequency identification (RFID) tag; and a master module associated with a second component separated from the first component and comprising a master module controller operable to control the master module to: receive the identification information via a master WLN interface or a master RFID reader; acquire location information for the master module via a global positioning system (GPS); and transmit the identification information and the location information to a server remote from the wellsite via a wireless wide area network (WWAN) transceiver.

The child module controller may be operable to control the child module to provide operational information related to an operation of the first component via the WLN transceiver, and the master module controller may be operable to control the master module to: receive the operational information via the master WLN interface; and transmit the operational information to the server via the WWAN transceiver. In such implementations, among others within the scope of the present disclosure, the operational information may comprise at least one of: electronic control module (ECM) information from an ECM of the first component; and an operational parameter of the first component received from a sensor associated with the first component.

The child module may be a first child module, the child module controller may be a first child module controller, the identification information may be first identification information, the WLN transceiver may be a first WLN transceiver, the RFID tag may be a first RFID tag, and the system may further comprise a second child module associated with a third component and comprising a second child module controller operable to control the second child module to provide second identification information of the third component via a second WLN transceiver or a second RFID tag, wherein the master module controller may be operable to control the master module to: receive the second identification information via the master WLN interface or the master RFID reader; and transmit the second identification information to the server via the WWAN transceiver. In such implementations, among others within the scope of the present disclosure, the first child module and the second child module may form at least a portion of a mesh network in cooperation with the first WLN transceiver and second WLN transceiver, respectively.

The WWAN transceiver may be a cellular transceiver or a satellite transceiver.

The RFID tag may be a passive RFID tag and the master RFID reader may be a passive RFID reader.

The RFID tag may be an active RFID tag and the master RFID reader may be an active RFID reader.

The master module may be located at a wellsite control center.

The first component may be selected from the group consisting of: a container operable for storing materials utilized during wellsite operations; a pump operable for pumping materials during wellsite operations; and a mixer operable for mixing materials during wellsite operations. However, the first component may be other types of wellsite equipment.

The master module controller may be operable to control the master module to transmit the identification information and the location information to the server at a predetermined time interval. The predetermined time interval may range between about three minutes and about 24 hours.

The master module controller may be operable to control the master module to transmit high priority information substantially immediately.

The present disclosure also introduces an apparatus comprising: an apparatus controller operable to control the apparatus to: receive a tracking event associated with a first piece of wellsite equipment, wherein the tracking event is based on: first identification information for a first module, but not location information for the first module, wherein the first module is associated with the first piece of wellsite equipment, and wherein the first piece of wellsite equipment is at a location; and second identification information for a second module, and location information for the second module, wherein the second module is associated with a second piece of wellsite equipment, and wherein the second piece of wellsite equipment is at the location; and determine a utilization state associated with the first piece of wellsite equipment, wherein determining the utilization state is based on the tracking event.

The utilization state may be selected from the group consisting of: awaiting maintenance at the location; performing maintenance at the location; waiting for deployment at the location; performing a job at the location; and moving between the location and another location.

The tracking event may be a first tracking event, the location may be a first location, and the apparatus controller may be further operable to control the apparatus to: receive a second tracking event associated with the first piece of wellsite equipment, wherein the second tracking event is based on: the first identification information for the first module, but not location information for the first module, when the first piece of wellsite equipment is at a second location; and the second identification information for the second module, and location information for the second module, when the second piece of wellsite equipment is at the second location; and determine a second utilization state associated with the first piece of wellsite equipment, wherein determining the second utilization state is based on the second tracking event.

The tracking event may be a first tracking event, the location may be a first location, and the apparatus controller may be further operable to control the apparatus to: receive a second tracking event associated with the first piece of wellsite equipment, wherein the second tracking event is based on: the first identification information for the first module, but not location information for the first module, when the first piece of wellsite equipment is at a second location; and third identification information for a third module associated with a third piece of wellsite equipment, and location information for the third module, when the third piece of wellsite equipment is at the second location; and determine a second utilization state associated with the first piece of wellsite equipment, wherein determining the second utilization state is based on the second tracking event.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to permit the reader to quickly ascertain the nature of the technical disclosure. It is submitted with the understanding that it will not be used to interpret or limit the scope or meaning of the claims.

What is claimed is:

1. A method, comprising:
   receiving, at a first device at a first location, first identification information and first location information for a first module, wherein the first module is associated with a first piece of wellsite equipment, and wherein the first piece of wellsite equipment is at the first location;
   receiving, at the first device at the first location, second identification information for a second module, wherein the second module is associated with a second piece of wellsite equipment, and wherein the second piece of wellsite equipment is at the first location;
   determining, by the first device, a tracking event associated with the second piece of wellsite equipment, wherein the tracking event is determined based on the first identification information, the first location information, and the second identification information;
   transmitting the determined tracking event from the first device to a second device that is located at a second location remote from the first location;
   determining, by the second device, a utilization state associated with the second piece of wellsite equipment, wherein:
      the second device determines the utilization state associated with the second piece of wellsite equipment based on the tracking event determined by and received from the first device; and
      the utilization state determined by the second device is selected from the group consisting of "awaiting maintenance," "performing maintenance," "waiting for deployment," "performing a job," and "moving between locations".

2. The method of claim 1 wherein:
   receiving the first identification information at the first device comprises receiving the first identification information at the first device from the first module; and
   receiving the second identification information at the first device comprises:
      receiving the second identification information at the first module from the second module; and
      receiving the second identification information at the first device from the first module.

3. The method of claim 1 wherein the tracking event is a first tracking event, and wherein the method further comprises:
   moving the first and second pieces of wellsite equipment to a third location remote from the first and second locations, and then:
      receiving the first identification information and second location information for the first module when the first piece of wellsite equipment is at the third location;
      receiving the second identification information for the second module when the second piece of wellsite equipment is at the third location; and
      determining a second tracking event associated with the second piece of wellsite equipment, wherein the second tracking event is determined based on the first identification information, the second location information, and the second identification information.

4. The method of claim 3 wherein the utilization state is a first utilization state, and wherein the method further comprises:
   determining a second utilization state associated with the second piece of wellsite equipment, wherein determining the second utilization state is based on the second tracking event.

5. The method of claim 1 wherein the tracking event is a first tracking event, and wherein the method further comprises:
   receiving third identification information and second location information for a third module, wherein the third module is associated with a third piece of wellsite equipment, and wherein the third piece of wellsite equipment is at a third location;
   receiving the second identification information for the second module when the second piece of wellsite equipment is at the third location; and
   determining a second tracking event associated with the second piece of wellsite equipment, wherein the second tracking event is based on the third identification information, the second location information, and the second identification information.

6. The method of claim 5 wherein the utilization state is a first utilization state, and wherein the method further comprises:
   determining a second utilization state associated with the second piece of wellsite equipment, wherein determining the second utilization state is based on the second tracking event.

7. The method of claim 1 wherein the tracking event determined by the first device is selected from the group consisting of:

a first indicator indicating that a most recent event experienced by the second piece of wellsite equipment was entering an oilfield equipment base facility;
a second indicator indicating that the most recent event experienced by the second piece of wellsite equipment was exiting the base facility;
a third indicator indicating that the most recent event experienced by the second piece of wellsite equipment was entering an oilfield equipment maintenance facility;
a fourth indicator indicating that the most recent event experienced by the second piece of wellsite equipment was exiting the maintenance facility;
a fifth indicator indicating that the most recent event experienced by the second piece of wellsite equipment was starting operation at a oilfield wellsite; and
a sixth indicator indicating that the most recent event experienced by the second piece of wellsite equipment was ending operation at the oilfield wellsite.

8. A system comprising:
a plurality of pieces of wellsite equipment individually or collectively disposed on or integral to one or more of a plurality of mobile carriers at a wellsite, wherein the plurality of pieces of wellsite equipment include:
a first mixer operable to combine a liquid and a first material to form a base fluid;
a second mixer fluidly connected with the first mixer and operable to combine the base fluid and a second material to form a mixture;
a plurality of pump assemblies; and
a manifold fluidly connected with the second mixer and the pump assemblies and operable to distribute the mixture to the pump assemblies, wherein the pump assemblies are operable to pressurize and return the mixture to the manifold, and wherein the manifold is operable to direct the pressurized mixture towards a wellbore at the wellsite; and
a control center disposed on one of the mobile carriers and operable to provide control to one or more of the pieces of wellsite equipment, wherein:
each of the plurality of pieces of wellsite equipment comprises a child module comprising a child module controller operable to control the child module to transmit identification information of the corresponding piece of wellsite equipment via a wireless local network (WLN) transceiver or a radio frequency identification (RFID) tag; and
the control center comprises a master module comprising a master module controller operable to control the master module to:
receive the identification information via a master WLN interface or a master RFID reader;
acquire location information for the master module via a global positioning system (GPS); and
transmit the identification information and the location information to a server remote from the wellsite via a wireless wide area network (WWAN) transceiver.

9. The system of claim 8 wherein:
each child module controller is operable to control the corresponding child module to provide operational information related to an operation of the corresponding piece of wellsite equipment via the WLN transceiver; and
the master module controller is operable to control the master module to:
receive the operational information via the master WLN interface; and
transmit the operational information to the server via the WWAN transceiver.

10. The system of claim 9 wherein the operational information comprises at least one of:
electronic control module (ECM) information from an ECM of the corresponding piece of wellsite equipment; and
an operational parameter of the corresponding piece of wellsite equipment received from a sensor associated with the corresponding piece of wellsite equipment.

11. The system of claim 8 wherein the child modules form at least a portion of a mesh network in cooperation with the WLN transceivers.

12. The system of claim 8 wherein the master module controller is operable to control the master module to transmit high priority information substantially immediately.

13. The system of claim 8 wherein:
the plurality of pieces of wellsite equipment further comprise:
a first container containing the first material;
a tank containing the liquid; and
a second container comprising the second material;
the first material comprises guar, a polymer, a synthetic polymer, galactomannan, a polysaccharide, cellulose, and/or clay;
the liquid comprises an aqueous fluid; and
the second material comprise a proppant material.

14. The system of claim 8 wherein first material comprises a hydratable material or gelling agent.

15. The system of claim 14 wherein the base fluid comprises a gel.

16. The system of claim 8 wherein the mixture is fracturing fluid.

* * * * *